United States Patent
Xu

(10) Patent No.: US 8,908,813 B2
(45) Date of Patent: Dec. 9, 2014

(54) COEFFICIENT CALCULATION METHOD AND DEVICE FOR TIME-DOMAIN CHANNEL ESTIMATION FILTER

(75) Inventor: Bai Cheng Xu, Nuremberg (DE)

(73) Assignee: ST-Ericsson Semiconductor (Beijing) Co., Ltd, Beijing (CN)

( * ) Notice: Subject to any disclaimer, the term of this patent is extended or adjusted under 35 U.S.C. 154(b) by 0 days.

(21) Appl. No.: 13/977,375

(22) PCT Filed: Dec. 30, 2011

(86) PCT No.: PCT/CN2011/085002
§ 371 (c)(1),
(2), (4) Date: Nov. 12, 2013

(87) PCT Pub. No.: WO2012/089156
PCT Pub. Date: Jul. 5, 2012

(65) Prior Publication Data
US 2014/0056393 A1    Feb. 27, 2014

(30) Foreign Application Priority Data

Dec. 31, 2010    (CN) .......................... 2010 1 0624296

(51) Int. Cl.
*H04L 27/06* (2006.01)
*H04L 25/02* (2006.01)
*H04L 27/26* (2006.01)

(52) U.S. Cl.
CPC ........ *H04L 27/2663* (2013.01); *H04L 25/0232* (2013.01); *H04L 25/0212* (2013.01)
USPC ........... 375/340; 375/150; 375/343; 375/368; 375/491; 375/500; 375/510; 455/226.1

(58) Field of Classification Search
USPC ......... 375/147, 149, 150, 152, 260, 340, 343, 375/362, 365, 368; 370/491, 500, 509–512, 370/252; 455/67.11, 226.1
See application file for complete search history.

(56) References Cited

U.S. PATENT DOCUMENTS 8,761,274 B2 * 6/2014 Lopez de Victoria ......... 375/260
2010/0283902 A1 * 11/2010 Rashid et al. ................. 348/725
2012/0027140 A1 * 2/2012 Weng et al. ................... 375/350

FOREIGN PATENT DOCUMENTS

CN    101534266 A    9/2009
CN    101753498 A    6/2010

(Continued)

OTHER PUBLICATIONS

International Search Report issued in corresponding International application No. PCT/CN2011/085002, date of mailing Apr. 5, 2012.

*Primary Examiner* — Dac Ha
(74) *Attorney, Agent, or Firm* — Patent Portfolio Builders PLLC

(57) ABSTRACT

The present invention provides a method and a device for calculating a coefficient of a time-domain channel estimation filter. The method comprises: acquiring position information and weight information of symbols carrying RS information corresponding to $X_1, X_2 \ldots X_P$; acquiring position information and weight information of symbols carrying RS information relating to $Y_1, Y_2, \ldots Y_Q$; calculating an autocorrelation matrix of a vector I in accordance with the position information and the weight information, wherein $I=[X_1, X_2, \ldots X_P, Y_1, Y_2, \ldots Y_Q]$; calculating a crosscorrelation matrix of a vector O and the vector I in accordance with the position information and the weight information, wherein $O=[Y_0]$, and $Y_0$ is a time-domain channel ideal value of the symbol on which the channel estimation is currently performed; and calculating an inverse matrix product of the crosscorrelation matrix and the autocorrelation matrix, thereby obtaining a coefficient vector corresponding to the symbol on which the channel estimation is currently performed. According to the present invention, it is able to calculate an optimal filter coefficient.

20 Claims, 6 Drawing Sheets

(56) References Cited

FOREIGN PATENT DOCUMENTS

| | | |
|---|---|---|
| CN | 101795246 A | 8/2010 |
| CN | 101815042 A | 8/2010 |
| CN | 102123127 A | 7/2011 |
| WO | 2010/090787 A1 | 8/2010 |

* cited by examiner

COEFFICIENT CALCULATION METHOD AND DEVICE FOR TIME-DOMAIN CHANNEL ESTIMATION FILTER

TECHNICAL FIELD

The present invention relates to the field of wireless communication technology, in particular to a method and a device for calculating a coefficient of a time-domain channel estimation filter in a Long Term Evolution (LTE) system.

BACKGROUND

In a LTE wireless communication system, Orthogonal Frequency Division Multiplexing (OFDM), as a core physical layer technology, modulates data stream on a plurality of orthogonal subcarriers, among which the frequency spectra can be overlapped with each other. As a result, the spectral efficiency will be increased remarkably.

Referring to FIG. 1, in an OFDM system, the transmitted information may be described with a resource grid, through which the entire time-domain and frequency-domain resources will be shown in the form of Resource Elements (RE). In other words, each smallest square in FIG. 1 corresponds to a time length of a subcarrier on the frequency domain and a symbol on the time domain, and the information to be transmitted is carried by the REs. The multiple REs constitute a resource block. To be specific, in the case of a normal cyclic prefix (CP), one resource block is formed by 12 subcarriers*7 symbols, and in the case of an extended CP, one resource block is formed by 12 subcarriers*6 symbols.

In order to demodulate the data correctly, it is necessary to know the channel condition at each RE position. In a LTE system, channel estimation at each RE position is obtained by inserting a known reference signal (RS) at a specific RE position for each resource block to calculate the channel estimation at the RE position, and then obtaining the channel estimation at all of the other RE positions by interpolation.

A channel estimation algorithm is usually performed in two steps. At first, frequency-domain channel estimation is performed in the frequency domain, i.e., with respect to a row of symbols that have RSs in FIG. 1, interpolation filtering is performed on initial channel estimation values of the RSs to obtain the frequency channel estimation for each symbol on the row, and then interpolation filtering is performed in the time domain in accordance with the result to complete time-domain channel estimation, i.e., to obtain the final channel estimation value. For clarification hereinafter, $H_f^{(RS)}$ is used to represent the frequency-domain channel estimation of the symbol carrying RS information, including the channel estimation obtained by frequency-domain interpolation.

The LTE system includes two modes, i.e., TDD and FDD. For the FDD mode, a UE may receive continuous downlink subframes, and for the TDD mode, the received downlink subframes are discontinuous, i.e., the RS distribution is discontinuous as shown in FIG. 2, in which D represents the downlink subframes and U represents uplink subframes.

Actually, even if the continuous downlink subframes can be received in the FDD mode, the RS distribution in one subframe is uneven in a normal CP mode. As shown in FIG. 3, the interval between the symbols carrying the RS information may include 3 or 4 symbols.

The key for the frequency-domain interpolation filtering and time-domain interpolation filtering is to select suitable filter structures and filter coefficients. However, due to the discontinuous and uneven RS distribution in the LTE system, it becomes a challenge to select the time-domain channel estimation filter and the coefficients thereof.

SUMMARY

An object of the present invention is to provide a method and a device for calculating a coefficient of a time-domain channel estimation filter, so as to effectively overcome the problems due to the discontinuous and uneven RS distribution in the LTE system.

To achieve the above object, the present invention provides a method for calculating a coefficient of a time-domain channel estimation filter for use in a LTE system, comprising the steps of:

acquiring position information and weight information of symbols carrying RS information corresponding to $X_1$, $X_2 \ldots X_P$, wherein $X_1, X_2, \ldots X_P$ are P frequency-domain channel estimation values of the symbols closest to a currently-input symbol, and P is an integer greater than 0;

acquiring position information and weight information of symbols carrying RS information relating to $Y_1, Y_2, \ldots Y_Q$, wherein $Y_1, Y_2, \ldots Y_Q$ are Q time-domain channel estimation values of the symbols closest to a symbol on which the channel estimation is currently performed, and Q is an integer greater than 0;

calculating an autocorrelation matrix of a vector I in accordance with the position information and the weight information, wherein $I=[X_1, X_2 \ldots X_P, Y_1, Y_2, \ldots Y_Q]$;

calculating a crosscorrelation matrix of a vector O and the vector I in accordance with the position information and the weight information, wherein $O=[Y_0]$, and $Y_0$ is a time-domain channel ideal value of the symbol on which the channel estimation is currently performed; and calculating an inverse matrix product of the crosscorrelation matrix and the autocorrelation matrix, thereby obtaining a coefficient vector corresponding to the symbol on which the channel estimation is currently performed.

The present invention further provides a device for calculating a coefficient of a time-domain channel estimation filter for use in a LTE system, comprising:

a first acquiring module, configured to acquire position information and weight information of symbols carrying RS information corresponding to $X_1$, $X_2 \ldots X_P$, wherein $X_1$, $X_2 \ldots X_P$ are P frequency-domain channel estimation values of the symbols closest to a currently-input symbol, and P is an integer greater than 0;

a second acquiring module, configured to acquire position information and weight information of symbols carrying RS information relating to $Y_1, Y_2, \ldots Y_Q$, wherein $Y_1, Y_2, \ldots Y_Q$ are Q time-domain channel estimation values of the symbols closest to a symbol on which the channel estimation is currently performed, and Q is an integer greater than 0;

an autocorrelation calculating module, configured to calculate an autocorrelation matrix of a vector I in accordance with the position information and the weight information, wherein $I=[X_1, X_2 \ldots X_P, Y_1, Y_2 \ldots Y_Q]$;

a crosscorrelation calculating module, configured to calculate a crosscorrelation matrix of a vector O and the vector I in accordance with the position information and the weight information, wherein $O=[Y_0]$, and $Y_0$ is a time-domain channel ideal value of the symbol on which the channel estimation is currently performed; and a filter coefficient calculating module, configured to calculate an inverse matrix product of the crosscorrelation matrix and the autocorrelation matrix, thereby to obtain a coefficient vector corresponding to the symbol on which the channel estimation is currently performed.

As compared with the prior art, the method and device according to the present invention may use iterative operation to record the position information and the weight information of $H_f^{(RS)}$ included in the current available resources $X_1$, $X_2, \ldots X_P$ and $Y_1, Y_2, \ldots Y_Q$, calculate the correlation between the available resources and the correlation between the available resources and the current symbol in accordance with the position information, weight information, channel information and system information, and thereby calculate an optimal filter coefficient. As a result, it is able to effectively overcome the problems due to the discontinuous and uneven RS distribution in the LTE system, and it is applicable to the coefficient design for the time-domain channel estimation filter with any frame structure and any antenna port in the LTE system.

DETAILED DESCRIPTION

To make the objects, the technical solutions and the advantages of the present invention more apparent, the present invention is described hereinafter in conjunction with the drawings and the embodiments.

Figure 4:
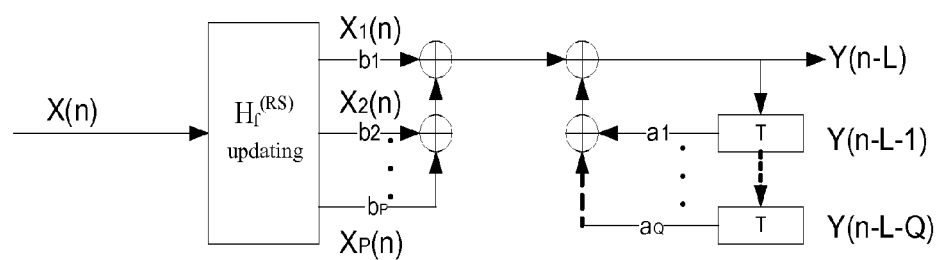
FIG. 4 is a structural schematic view showing a time-domain channel estimation filter according to embodiments of the present invention.

FIG. 4 is a structural schematic view showing a time-domain channel estimation filter according to embodiments of the present invention. The present invention aims to design a coefficient of the time-domain channel estimation filter as shown in FIG. 4 in accordance with available resources, channel information and system information.

Referring to FIG. 4, the interpolation filter uses P registers to store P frequency-domain channel estimation values $X_1 \sim X_P$ (including channel estimation values obtained by frequency-domain interpolation) of the symbols that carry RS information and that are closest to a currently-input symbol (with a serial number of n), uses Q registers to store Q time-domain channel estimation historical values $Y(n-L-1) \sim Y(n-L-Q)$ (i.e., Q time-domain channel estimation values are obtained by interpolation filtering via the filter, which are also represented hereinafter by $Y_1, Y_2, \ldots Y_Q$, wherein $Y_1$ represents $Y(n-L-1)$, $Y_2$ represents $Y(n-L-2), \ldots$) of the symbols closest to a symbol on which the channel estimation is currently performed (the symbol with a serial number of n-L), and then performs time-domain channel estimation interpolation filtering on the symbol on which the channel estimation is currently performed in accordance with the stored values. Such a process is expressed as the following equation:

$$Y(n-L) = \sum_{p=1}^{P} b_p X_p(n) + \sum_{q=1}^{Q} a_q Y(n-L-q)$$

When $Q \neq 0$, the filter is an infinite impulse response (IIR) filter, and when $Q=0$, the filter is a finite impulse response (FIR) filter. Herein, L represents a time delay, i.e., the number of symbols between input and output of the filter. Usually, the larger the time delay, the more the frequency-domain channel estimation values that can be used for time-domain channel estimation, and the better to perform the time-domain channel estimation. However, the system delay will increase adversely. In actual application, a compromise may be made therebetween in accordance with the practical requirements.

Figure 1:
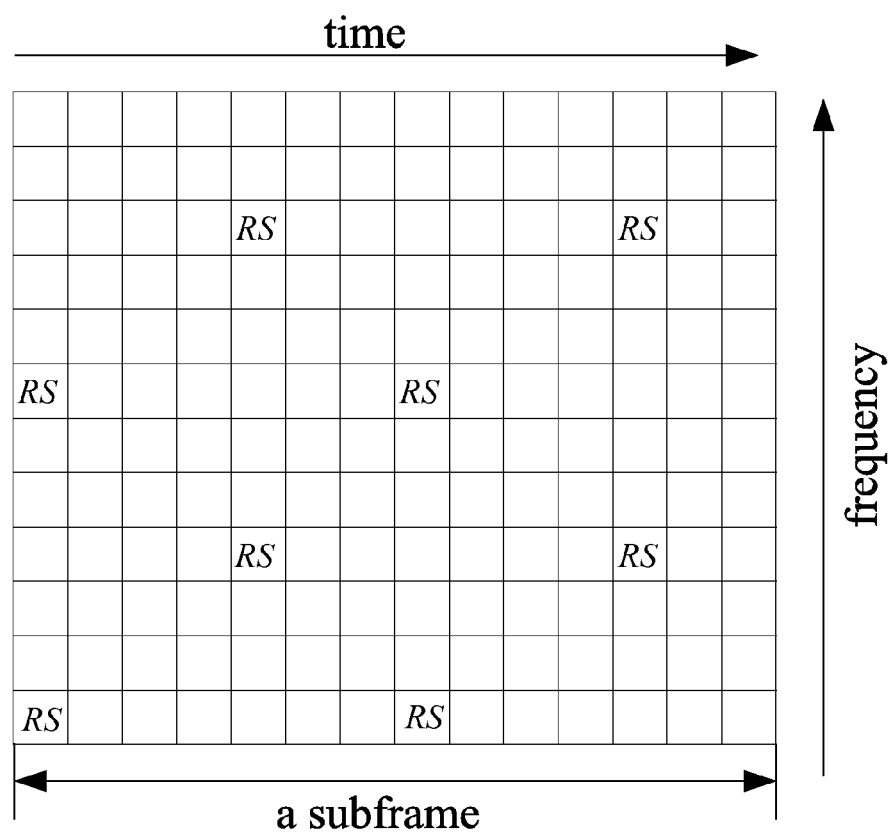
FIG. 1 is a schematic view showing the distribution of reference signals in a resource block in the case of a normal CP and a single antenna.
Figure 2:
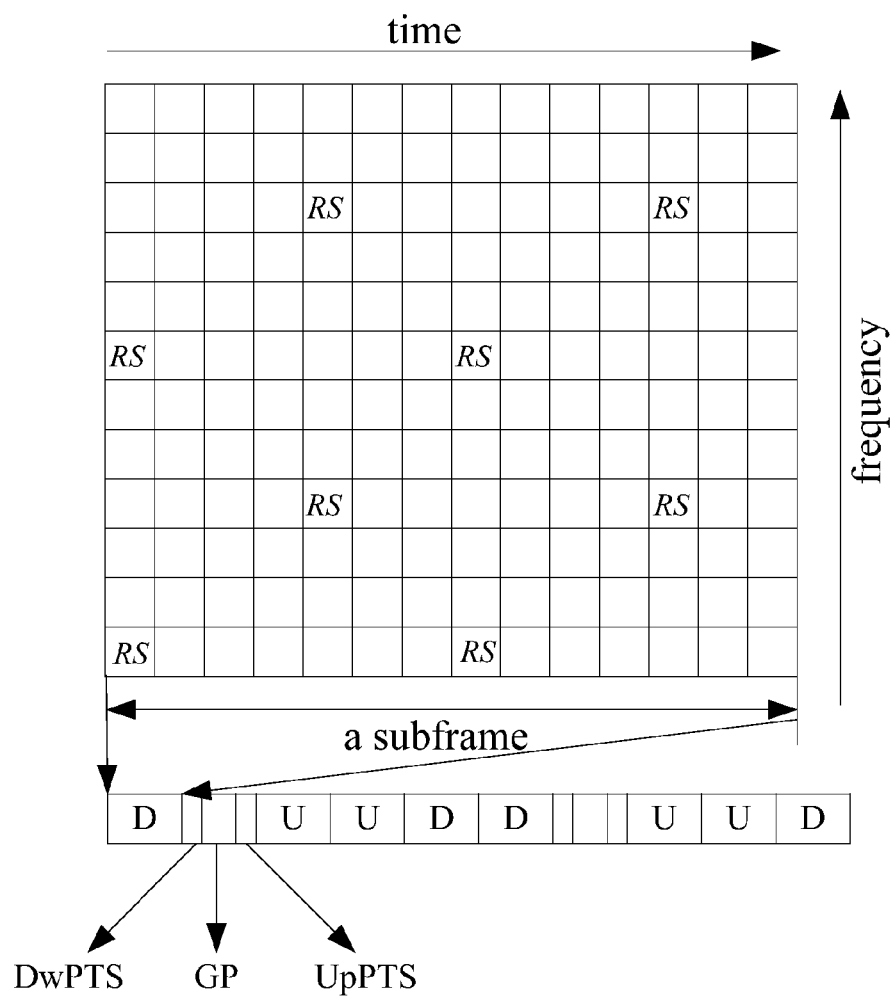
FIG. 2 is a schematic view showing the subframe distribution in a TDD mode and a normal CP mode where the uplink and downlink transformation is configured as 1#.
Figure 3:
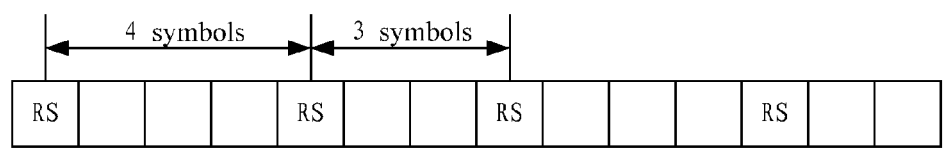
FIG. 3 is a schematic view showing the distribution of the symbols carrying RS information in a subframe in an FDD mode and in a normal CP mode.

Different from the structure of a common filter, the filter herein comprises an $H_f^{(RS)}$ updating module, because frequency-domain channel estimation value $H_f^{(RS)}$ of the symbols carrying RS information is input into the filter. However, it is not all the symbols that carry the RS information. Referring to FIG. 1, for a normal CP mode with a single antenna port, merely four of the fourteen symbols in one subframe carry the RS information, i.e., merely four inputs of the $1^{st}$, $5^{th}$, $8^{th}$ and $12^{th}$ (starting at 1) symbols are valid. The $H_f^{(RS)}$ updating module may be implemented in various modes, and two modes are described hereinafter.

In Mode 1, the $H_f^{(RS)}$ updating module updates the frequency-domain channel estimation values of the symbols that carry the RS information and are closest to the currently-input symbol in the P registers. $L_{RS}$ represents the serial number of the symbol carrying the RS information, and the operation process may be expressed by pseudo codes as follows:

```
If n ∈ L_RS
    X_P = X_{P-1}
    X_{P-1} = X_{P-2}
    ...
    X_2 = X_1
    X_1 = X(n)
Else
    X_P = X_P
    X_{P-1} = X_{P-1}
    ...
    X_2 = X_2
    X_1 = X_1
End
``` wherein, X(n) represents the frequency-domain channel estimation value of the currently-input symbol.

Hence, the updating according to Mode 1 includes: when a new symbol is input, judging whether or not the symbol carries the RS information; if yes, updating $X_i$ to $X_{i-1}$ from i=P and updating $X_1$ to X(n) when i=1; if not, not updating $X_1 \sim X_P$, i.e., each of $X_1 \sim X_P$ will remain unchanged.

As a result, the P frequency-domain channel estimation values of the symbols (which may include the currently-input symbol) that carry the RS information and are closest to the currently-input symbol are stored in $X_1 \sim X_P$.

In Mode 2, the operation process may be expressed by pseudo codes as follows:

```
        X_P = X_{P-1}
        X_{P-1} = X_{P-2}
        ...
        X_2 = X_1
        If n ∈ L_{RS}
            X_1 = X(n)
        Else
            X_1 = X_1
        End
``` wherein, X(n) represents the frequency-domain channel estimation values of the currently-input symbol.

Hence, the updating according to Mode 2 includes: when a new symbol is input, updating $X_i$ to $X_i$, from i=P, and judging whether or not the symbol carries the RS information when i=1; if yes, updating $X_1$ to X(n), and otherwise, not updating $X_1$.

As a result, the P frequency-domain channel estimation values of the symbols (which may include the currently-input symbol) that carry the RS information and are closest to the currently-input symbol are stored in $X_1 \sim X_P$. Here, the frequency-domain channel estimation values of $X_1 \sim X_P$ may include duplicate values (i.e., an identical value may be stored in $X_1$ and $X_2$).

Of course, the $H_f^{(RS)}$ may be updated in other ways, which will not be repeated herein.

Based on the above-mentioned time-domain channel estimation filter, the present invention provides a method for calculating a coefficient of the filter.

Figure 5:
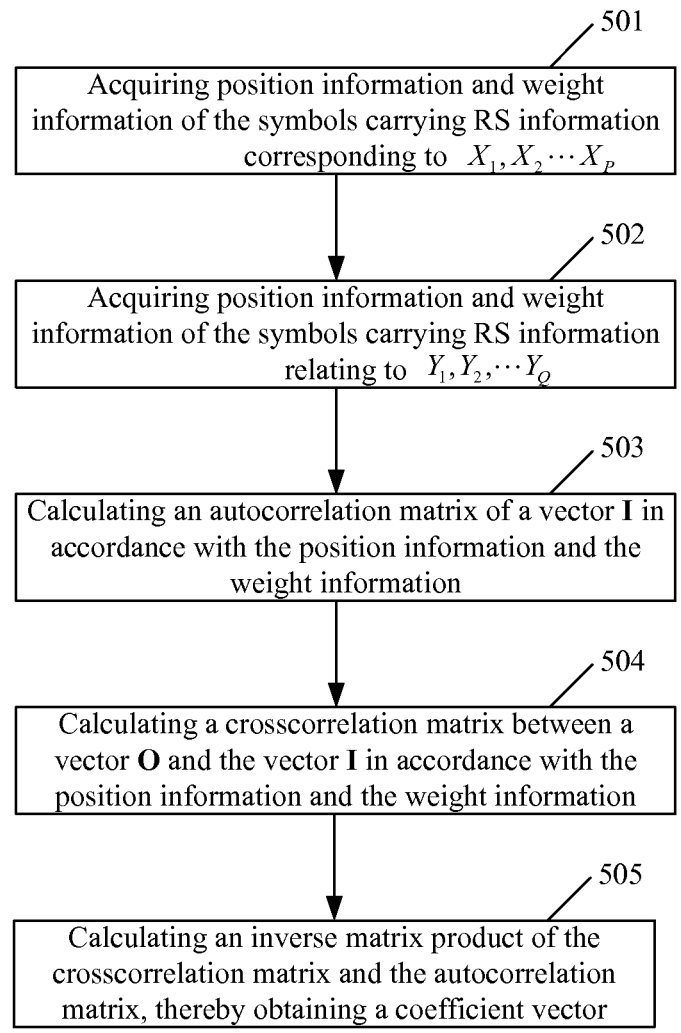
FIG. 5 is a flow chart of a method for calculating a coefficient of a time-domain channel estimation filter according to embodiments of the present invention.

Referring to FIG. 5, the method for calculating a coefficient of the time-domain channel estimation filter is used in a LTE system, and mainly comprises the following steps:

Step 501: acquiring position information and weight information of the symbols carrying RS information corresponding to $X_1, X_2 \ldots X_P$, wherein $X_1, X_2 \ldots X_P$ are P frequency-domain channel estimation values of the symbols closest to a currently-input symbol, and P is an integer greater than 0;

Step 502: acquiring position information and weight information of the symbols carrying RS information relating to $Y_1, Y_2, \ldots Y_Q$, wherein $Y_1, Y_2, \ldots Y_Q$ are Q time-domain channel estimation values of the symbols closes to a symbol on which the channel estimation is currently performed, and Q is an integer greater than 0;

Step 503: calculating an autocorrelation matrix of a vector I in accordance with the position information and the weight information, wherein I=[$X_1, X_2, \ldots X_P, Y_1, Y_2, \ldots Y_Q$];

Step 504: calculating a crosscorrelation matrix between a vector O and the vector I in accordance with the position information and the weight information, wherein O=[$Y_0$], and $Y_0$ is a time-domain channel ideal value of the symbol on which the channel estimation is currently performed; and Step 505: calculating an inverse matrix product of the crosscorrelation matrix and the autocorrelation matrix, thereby obtaining a coefficient vector corresponding to the symbol on which the channel estimation is currently performed.

The order of Steps 503 and 504 are not limited herein, i.e., Step 503 may be performed subsequent to Step 504, or the steps may be performed simultaneously.

The implementation of the above steps may refer to the description hereinafter about a device for calculating a coefficient of a time-domain channel estimation filter.

Figure 6:
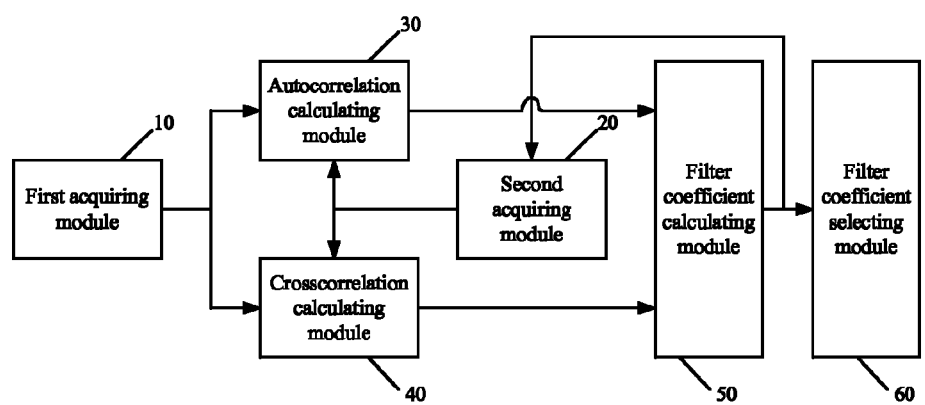
FIG. 6 is a block diagram of a device for calculating a coefficient of a time-domain channel estimation filter according to embodiments of the present invention.

FIG. 6 shows a device for calculating a coefficient of a time-domain channel estimation filter, mainly comprising: a first acquiring module 10, a second acquiring module 20, an autocorrelation calculating module 30, a crosscorrelation calculating module 40, a filter coefficient calculating module 50 and a filter coefficient selecting module 60. The working principles of the above modules are described hereinafter.

First Acquiring Module 10

The first acquiring module 10 is configured to record position information and weight information of the symbols carrying RS information corresponding to $X_1 \sim X_P$ according to the update modes adopted by the time-domain channel estimation filter. As mentioned hereinbefore, $X_1, X_2 \ldots X_P$ are P frequency-domain channel estimation values of the symbols closest to a currently-input symbol (with a serial number of n) (here, the closest symbols may include the currently-input symbol), and P is an integer greater than 0. The position information and the weight information corresponding to $X_1 \sim X_P$ are expressed as $D^{(X_1)} \sim D^{(X_P)}$ and $W^{(X_1)} \sim W^{(X_P)}$ respectively, and they need to be initialized as invalid values, i.e., $D^{(X_1)} \sim D^{(X_P)} = 0$ and $W^{(X_1)} \sim W^{(X_P)} = 0$.

If $X_1 \sim X_P$ are updated in accordance with Mode 1, the updating process of $D^{(X_1)} \sim D^{(X_P)}$ and $W^{(X_1)} \sim W^{(X_P)}$ may be expressed by pseudo codes as follows:

```
If n ∈ L_{RS}
    D^{(X_P)} = D^{(X_{P-1})}, W^{(X_P)} = W^{(X_{P-1})}
    D^{(X_{P-1})} = D^{(X_{P-2})}, W^{(X_{P-1})} = W^{(X_{P-2})}
    ...
    D^{(X_2)} = D^{(X_1)}, W^{(X_2)} = W^{(X_1)}
    D^{(X_1)} = n, W^{(X_1)} = 1
Else
    D^{(X_P)} = D^{(X_P)}, W^{(X_P)} = W^{(X_P)}
    D^{(X_{P-1})} = D^{(X_{P-1})}, W^{(X_{P-1})} = W^{(X_{P-1})}
    ...
    D^{(X_2)} = D^{(X_2)}, W^{(X_2)} = W^{(X_2)}
    D^{(X_1)} = D^{(X_1)}, W^{(X_1)} = D^{(X_1)}
End
```

Hence, the updating according to Mode 1 includes: when a new symbol is input, judging whether or not the symbol carries the RS information; if yes, updating $D^{(X_i)}$ to $D^{(X_{i-1})}$ and updating $W^{(X_i)}$ to $W^{(X_{i-1})}$ from i=P, and when i=1, updating $D^{(X_1)}$ to n and updating $W^{(X_1)}$ to 1, n being a serial number of the symbol; otherwise, not updating the position information and the weight information, i.e., each of $D^{(X_1)} \sim D^{(X_P)}$ and $W^{(X_1)} \sim W^{(X_P)}$ will remain unchanged.

If $X_1 \sim X_P$ are updated according to Mode 2, the updating process of $D^{(X_1)} \sim D^{(X_P)}$ and $W^{(X_1)} \sim W^{(X_P)}$ may be expressed by pseudo codes as follows:

```
D^{(X_P)} = D^{(X_{P-1})}, W^{(X_P)} = W^{(X_{P-1})}
D^{(X_{P-1})} = D^{(X_{P-2})}, W^{(X_{P-1})} = W^{(X_{P-2})}
...
D^{(X_2)} = D^{(X_1)}, W^{(X_2)} = W^{(X_1)}
If n ∈ L_{RS}
    D^{(X_1)} = n, W^{(X_1)} = 1
Else
    D^{(X_1)} = D^{(X_1)}, W^{(X_1)} = W^{(X_1)}
End
```

Hence, the updating according to Mode 2 includes: when a new symbol is input, updating $D^{(X_i)}$ to $D^{(X_{i-1})}$ and updating $W^{(X_i)}$ to $W^{(X_{i-1})}$ from i=P, and judging whether or not the symbol carries the RS information when i=1; if yes, updating $D^{(X_1)}$ to n and updating $W^{(X_1)}$ to 1, n being a serial number of the symbol; otherwise, not updating $D^{(X_1)}$ and $W^{(X_1)}$. Here, the position information and the weight information corresponding to $X_1 \sim X_P$ may be duplicate, e.g., $X_1$ and $X_2$ may correspond to the same position information and weight information.

Autocorrelation Calculating Module 30

The autocorrelation calculating module 30 is configured to calculate the correlation among all input variables expressed as $I=[X_1, X_2 \ldots X_P, Y_1, Y_2, \ldots Y_Q]$, and shows it in the form of a matrix. As mentioned hereinbefore, $Y_1, Y_2, \ldots Y_Q$ are Q time-domain channel estimation values of the symbols closest to the symbol on which the channel estimation is currently performed, i.e., Q historical values obtained by interpolation filtering using the time-domain channel estimation filter, and Q is an integer greater than 0.

To be specific, the autocorrelation calculating module 30 calculates an autocorrelation matrix $R_{II}$ of the vector I using the following equation in accordance with the position information and weight information of the symbols carrying the RS information corresponding to $X_1, X_2 \ldots X_P$ and the position information and weight information of the symbols carrying the RS information relating to $Y_1, Y_2, \ldots Y_Q$:

$$R_{II} = E[II^H] = E\begin{bmatrix} X_1 X_1^* & X_1 X_2^* & \ldots & X_1 Y_Q^* \\ X_2 X_1^* & X_2 X_2^* & \ldots & X_2 Y_Q^* \\ \vdots & \vdots & \ddots & \vdots \\ X_Q X_1^* & X_Q X_2^* & \ldots & Y_Q Y_Q^* \end{bmatrix}$$

The elements in $R_{II}$ may be calculated as follows:

for $E[X_k X_m^*]$ and $E[X_k^* X_m]$, $$E[X_k X_m^*] = (E[X_k^* X_m])^* = W^{(X_k)}(W^{(X_m)})^* R(\tau_{D(X_k),D(X_m)}),$$

$k, m = 1, \ldots P;$ for $E[Y_k Y_m^*]$ and $E[Y_k^* Y_m]$, $$E[Y_k Y_m^*] = (E[Y_k^* Y_m])^* = \sum_{i=1}^{length(D^{(Y_k)})} \sum_{j=1}^{length(D^{(Y_m)})} W^{(Y_k)}(i)(W^{(Y_m)}(j))^* R(\tau_{D^{(Y_k)}(i),D^{(Y_m)}(j)}),$$

$k, m = 1, \ldots Q;$ and for $E[Y_k X_m^*]$ and $E[Y_k^* X_m]$, $$E[Y_k X_m^*] = (E[Y_k^* X_m])^* = \sum_{i=1}^{length(D^{(Y_k)})} W^{(Y_k)}(i)(W^{(X_m)})^* R(\tau_{D^{(Y_k)}(i),D(X_m)}),$$

$k = 1, \ldots Q,$ $m = 1, \ldots P$

When $D^{(Y_k)}$ corresponding to $Y_k$ ($k=1, \ldots Q$) is blank, $E[Y_k Y_m^*]$, $E[Y_k^* Y_m]$, $E[Y_k X_m^*]$ and $E[Y_k^* X_m]$ are all 0.

$E[\bullet]$ represents mathematical expectation operation, $D^{(X_m)}$ is the position information corresponding to $X_m$, $W^{(X_m)}$ is the weight information corresponding to $X_m$, wherein $m=1, \ldots P$, $D^{(Y_k)}$ is the position information corresponding to $Y_k$, $W^{(Y_k)}$ is the weight information corresponding to $Y_k$, $k=1, \ldots Q$, $W^{(Y_k)}(j)$ is the $j^{th}$ element of $W^{(Y_k)}$, $D^{(Y_k)}(j)$ is the $j^{th}$ element of $D^{(Y_k)}$, length($\bullet$) is the number of elements when the vector is calculated, $R(\tau_{i,j})$ is a correlation function determined in accordance with channel information and system information, and $\tau_{i,j}$ is the time distance between the $i^{th}$ symbol and the $j^{th}$ symbol.

In addition to $D^{(X_p)}$ and $D^{(Y_q)}$, the channel information and system information are also required to calculate the correlation function $R(\tau_{i,j})$. The channel information includes Doppler shift, SNR, channel fading model, etc. The system information includes CP mode, symbol length, etc. For example, the channel information and system information for designing the filter coefficient are shown in the following table:

| Channel information | Channel fading model | Rayleigh fading |
|---|---|---|
| | Maximum Doppler shift | $f_{max}$ |
| | Noise power | 0, i.e., an infinite SNR |
| System information | CP mode | Extended CP |
| | Symbol length | $T_{sym} = 1/12$ ms |

The correlation function may be expressed as:

$$R(\tau_{i,j}) = J_0(2\pi f_{max} \tau_{i,j}),$$

wherein $J_0(\bullet)$ represents a first-class 0-order Bessel function, $\tau_{i,j} = T_{sym}|i-j|$, and $T_{sym}$ represents a time length of a symbol.

A person skilled in the art may select the correlation functions of the other types for the other channel information and system information.

It is to be appreciated that, during the calculation of the autocorrelation matrix, the position information and weight information of the symbols carrying the RS information relating to $Y_1, Y_2, \ldots Y_Q$ include position information and weight information of the symbols carrying the RS information relating to $Y_1, Y_2, \ldots Y_Q$ corresponding to the symbol on which the channel estimation is currently performed, and the position information and the weight information are updated after the coefficient calculation is performed on a previous symbol. During initialization, the position information and the weight information are blank.

After obtaining a coefficient vector corresponding to the symbol on which the channel estimation is currently performed, the position information and the weight information of the symbols carrying the RS information relating to $Y_1$, $Y_2, \ldots Y_Q$ will also be updated for the coefficient calculation on a next symbol, and the process may refer to the description hereinafter about the second acquiring module 20.

That is to say, the calculation of the filter coefficient according to the present invention is an iterative process, and the position information and weight information of the symbols carrying the RS information relating to $Y_1, Y_2, \ldots Y_Q$ are the results updated after the previous coefficient calculation.

In addition, prior to the current coefficient calculation, the position information and weight information of the symbols carrying the RS information corresponding to $X_1, X_2 \ldots X_P$ are updated in accordance with a newly-input symbol (i.e., the current symbol n).

Crosscorrelation Calculating Module 40

The crosscorrelation calculating module 40 is configured to calculate the correlation between all the input variables and an output variable $Y_0$ (a time-domain channel ideal value of the symbol on which the channel estimation is currently performed), and show it in the form of a matrix. The input variables may be expressed as $I=[X_1, X_2, \ldots X_P, Y_1, Y_2, \ldots Y_Q]$. As mentioned hereinbefore, $Y_1, Y_2, \ldots Y_Q$ are Q time-domain channel estimation values of the symbols closest to the symbol on which the channel estimation is currently performed, i.e., Q historical values are obtained by interpolation filtering using the time-domain channel estimation filter, and Q is an integer greater than 0.

To be specific, the crosscorrelation calculating module 40 calculates a crosscorrelation matrix $R_{OI}$ between the vector O and the vector I according to the following equation in accordance with the position information and weight information of the symbols carrying the RS information corresponding to $X_1, X_2 \ldots X_P$ and the position information and weight information of the symbols carrying the RS information relating to $Y_1, Y_2, \ldots Y_Q$, wherein $O=[Y_0]$ $$R_{OI} = E[OI^H] = E\begin{bmatrix} Y_0 X_1^* \\ Y_0 X_2^* \\ \vdots \\ Y_0 Y_Q^* \end{bmatrix}.$$

The crosscorrelation matrix $R_{OI}$ includes two kinds of elements, i.e., $E[Y_0 X_p^*]$, $p = 1, \ldots P$ and $E[Y_0 Y_q^*]$, $q = 1, \ldots Q.$ For $E[Y_0 X_p^*]$, $E[Y_0 X_p^*] = (W^{(X_p)})^* R(\tau_{n-L, D^{(X_p)}})$, $p = 1, \ldots P,$ and for $E[Y_0 X_q^*]$, $q = 1, \ldots Q,$ $E[Y_0 Y_q^*] = \sum_{i=1}^{length(D^{(Y_q)})} (W^{(Y_q)}(i))^* R(\tau_{n-L, D^{(Y_q)}(i)})$, $q = 1, \ldots Q.$ When $D^{(Y_q)}$ corresponding to $Y_q$ (q=1, ... Q) is blank, $E[Y_0 Y_q]$ corresponding to $Y_q$ is 0.

$E[\bullet]$ represents mathematical expectation operation, $D^{(X_p)}$ is the position information corresponding to $X_p$, $W^{(X_p)}$ is the weight information corresponding to $X_p$, wherein p=1, ... P, $D^{(Y_q)}$ is the position information corresponding to $Y_q$, $W^{(Y_q)}$ is the weight information corresponding to $Y_q$, wherein q= 1, ... Q, $W^{(Y_q)}$ is the $i^{th}$ element of $W^{(Y_q)}$, $D^{(Y_q)}(i)$ is the $i^{th}$ element of $D^{(Y_q)}$, length(•) is the number of elements when the vector is calculated, $R(\tau_{i,j})$ is a correlation function determined in accordance with channel information and system information, $\tau_{i,j}$ is the time distance between the $i^{th}$ symbol and the $j^{th}$ symbol, n−L is the serial number of the symbol on which the channel estimation is currently performed, n is the serial number of the currently-input symbol, and L is the time delay, i.e., the number of symbols between input and output of the filter.

Here, the selection of the correlation function $R(\tau_{i,j})$ may refer to the description hereinbefore.

It is to be appreciated that, during the calculation of the crosscorrelation matrix, the position information and weight information of the symbols carrying the RS information relating to $Y_1, Y_2, \ldots Y_Q$ include position information and weight information of the symbols carrying the RS information relating to $Y_1, Y_2, \ldots Y_Q$ corresponding to the symbol on which the channel estimation is currently performed. The position information and the weight information are updated after the coefficient calculation on a previous symbol. During initialization, the position information and the weight information are blank.

In addition, prior to the current coefficient calculation, the position information and weight information of the symbols carrying the RS information corresponding to $X_1, X_2, \ldots X_P$ are updated in accordance with a newly-input symbol (i.e., the current symbol n).

It is to be further appreciated that, $Y_0$ represents a time-domain channel ideal value of the symbol on which the channel estimation is currently performed, i.e., Y(n−L). In fact, it is unnecessary to know an actual value of Y(n−L), and merely the position information corresponding thereto, i.e., the serial number n−L of the symbol on which the channel estimation is currently performed, is used.

Filter Coefficient Calculating Module 50

The filter coefficient calculating module 50 is configured to calculate an optimal coefficient for the time-domain channel estimation value of the symbol on which the channel estimation is currently performed (i.e., the (n−L)$^{th}$ symbol by using the autocorrelation matrix $R_{II}$ and the crosscorrelation matrix $R_{OI}$ in accordance with a predetermined criterion. Its working principle is calculating an inverse matrix product of the crosscorrelation matrix and the autocorrelation matrix, thereby obtaining a coefficient vector corresponding to the symbol on which the channel estimation is currently performed.

In a preferred embodiment, the filter coefficient calculation schemes include matrix pretreatment, coefficient calculation and coefficient compensation.

In some cases, the matrix $R_{II}$ is not of full rank, and some specific rows and columns need to be deleted, i.e., it shall ensure that the matrix is of full rank by means of dimension reduction.

The matrix pretreatment is used to judge whether $R_{II}$ is of full rank in accordance with the RS information included in $X_1, X_2 \ldots X_P$ and $Y_1, Y_2, \ldots Y_Q$. If not, it needs to delete the specific rows and columns, i.e., to ensure that the matrix is of full rank by means of dimension reduction. The updated matrix is represented by $R'_{II}$, and the variables corresponding to the deleted rows and columns are represented by $X_{e'_1}$, $X_{e'_2} \ldots X_{e'_K}$ and $Y_{c'_1}, Y_{c'_2} \ldots Y_{c'_G}$, i.e., the deleted rows and columns are those corresponding to $X_{e'_1}, X_{e'_2} \ldots X_{e'_K}$ and $Y_{c'_1}, Y_{c'_2} \ldots Y_{c'_G}$, respectively, then the elements corresponding to $X_{e'_1}, X_{e'_2} \ldots X_{e'_K}$ and $Y_{c'_1}, Y_{c'_2} \ldots Y_{c'_G}$ in $R_{OI}$ shall also be deleted to obtain a new matrix $R'_{OI}$.

For example, $X_1, X_2 \ldots X_P$ and $Y_1, Y_2, \ldots Y_Q$ include M pieces of RS information. When M<P+Q, it needs to delete the (P+Q−M)$^{th}$ row and column from $R_{II}$ so as to ensure that the matrix is of full rank. The elements corresponding thereto in $R_{OI}$ shall also be deleted. Preferably, the row and column corresponding to $X_i$ whose position information and weight information are both 0, and the row and column corresponding to $Y_j$ whose position information and weight information are both 0, will be deleted. The coefficient corresponding to the deleted variables may be set to 0. When M≥P+Q, if there are multiple variables in $X_1, X_2 \ldots X_P$ corresponding to the same symbol carrying the RS information (e.g., when the updating process is performed by the first acquiring module 10 according to Mode 2), merely one of the multiple variables is reserved, the rows and columns corresponding to the other variables are deleted from $R_{II}$, and the elements corresponding thereto in $R_{OI}$ shall also be deleted. The coefficient corresponding to the deleted variables is set to 0. Identically, if there are multiple variables in $Y_1, Y_2, \ldots Y_Q$ that include the same RS information (the position vector and the weight vector are completely the same), merely one of the variables is reserved, the rows and columns corresponding to the other variables are deleted from $R_{II}$, and the elements corresponding thereto in $R_{OI}$ shall also be deleted. The coefficient corresponding to the deleted variables is set to 0.

The coefficient calculation is used to calculate a coefficient of the time-domain channel estimation filter based on $R'_{II}$ and $R'_{OI}$ in accordance with a minimum mean square error (MMSE) rule.

The variables not deleted during the matrix pretreatment are represented by $X_{e_1}, X_{e_2} \ldots X_{e_H}$, $e_1 < e_2 < \ldots < e_H$ and $Y_{c_1}$, $Y_{c_2} \ldots Y_{c_J}$, $c_1 < c_2 < \ldots c_J$. The coefficient calculation may be expressed as follows:

$$\begin{bmatrix} b_{e_1} \\ \vdots \\ b_{e_H} \\ a_{c_1} \\ \vdots \\ a_{c_J} \end{bmatrix} = R'_{OI}(R'_{II})^{-1}, b_{e'_1} = b_{e'_2} = \ldots b_{e'_K} = a_{c'_1} = a_{c'_2} = \ldots a_{c'_G} = 0.$$

When no variable is deleted during the matrix pretreatment, the coefficient calculation may be expressed as:

$$\begin{bmatrix} b_1 \\ \vdots \\ b_P \\ a_1 \\ \vdots \\ a_Q \end{bmatrix} = R_{OI}(R_{II})^{-1}.$$

The system compensation is used to normalize the calculated coefficient by multiplying it by a factor $\beta$. For example, if magnitude normalization is used, $\beta$ may be calculated using the following equation:

$$\beta = \frac{1}{\text{sum}(C)},$$

$$C = [b_1, \ldots b_P, a_1, \ldots a_Q],$$

wherein sum(C) represents a sum of all the elements in a vector C.

Second Acquiring Module 20

The second acquiring module 20 is configured to acquire the position information and the weight information of the symbols carrying the RS information relating to $Y_1, Y_2, \ldots Y_Q$. $Y_1, Y_2, \ldots Y_Q$ are Q time-domain channel estimation values of the symbols closest to the symbol on which the channel estimation is currently performed, and Q is an integer greater than 0.

The acquiring the position information and the weight information of the symbols carrying the RS information relating to $Y_1, Y_2, \ldots Y_Q$ includes: acquiring the position information and weight information of the symbols carrying the RS information relating to $Y_1, Y_2, \ldots Y_Q$ corresponding to the symbol on which the channel estimation is currently performed. The position information and the weight information are obtained after the coefficient calculation on a previous symbol, and during initialization, the position information and the weight information are blank. After obtaining the coefficient vector corresponding to the symbol on which the channel estimation is currently performed, the second acquiring module 20 is further configured to update the position information and the weight information of the symbols carrying the RS information relating to $Y_1, Y_2, \ldots Y_Q$ for the coefficient calculation on a next symbol.

The second acquiring module 20 updates the position information and the weight information of $H_f^{(RS)}$ included in the current $Y(n-L-1) \sim Y(n-L-Q)$ in accordance with the filter coefficient $[b_1, \ldots b_P, a_1, \ldots, a_Q]$ of the symbol on which the channel estimation is currently performed (i.e., the $(n-L)^{th}$ symbol), and the position information and weight information of $H_f^{(RS)}$ included in $X_1, X_2 \ldots X_P$ and $Y_1, Y_2, \ldots Y_Q$. $Y(n-L-q)$ ($1 \leq q \leq Q$) may represent a combination of all the frequency-domain channel estimation values of the symbols whose serial number is less than or equal to n-q, i.e., $$Y(n-L-q) = \sum_{\substack{i \leq n-q \\ i \in L_{RS}}} \alpha_i h_f(i),$$

$$q = 1, 2, \ldots Q,$$

wherein, $h_f(i)$ represents the channel estimation value of the $i^{th}$ symbol in the frequency domain. The second acquiring module 20 records the position information $\{i | i \leq n-q, i \in L_{RS}\}$ and the weight information $\{\alpha_i | i \leq n-q, i \in L_{RS}\}$.

The position information and weight information corresponding to $Y(n-L-1) \sim Y(n-L-Q)$ are stored in the vectors $D^{(Y_1)} \sim D^{(Y_Q)}$ and $W^{(Y_1)} \sim W^{(Y_Q)}$ respectively. The vectors where the position information and weight information are stored need to be initialized as blank.

The second acquiring module 20 updates the position information and the weight information of the symbols carrying the RS information relating to $Y_1, Y_2, \ldots Y_Q$, and the process may include the following five steps:

Step 1: defining temporary variables $D^{(temp)}$ and $W^{(temp)}$;
Step 2: making $W^{(temp)} = a_1 W^{(Y_1)}$ and $D^{(temp)} = D^{(Y_1)}$;
Step 3: For q=2:Q
$W^{(temp)}(1: \text{length}(W^{(Y_q)})) = W^{(temp)}(1: \text{length}(W^{(Y_q)})) + a_q W^{(Y_q)}$
End
Step 4: For p=1: P

```
If D^(Xp) ∈ D^(temp)
    i = find(D^(temp) == D^(Xp))
    W^(temp)(i) = W^(temp)(i) + b_p
Else
    W^(temp) = [W^(temp) b_p]
    D^(temp) = [D^(temp) D^(Xp)]
End
End
``` wherein the function find $(D^{(temp)} == D^{(X_p)})$ represents the serial number of the element in $D^{(temp)}$ that is equal to $D^{(X_p)}$; and Step 5: For q=Q: −1:2
$W^{(Y_q)} = W^{(Y_{q-1})}$, $D^{(Y_q)} = D^{(Y_{q-1})}$
End
$W^{(Y_1)} = W^{(temp)}$, $D^{(Y_1)} = D^{(temp)}$.

The above process is described as follows:

making $W^{(temp)}=a_1 W^{(Y_1)}$ and $D^{(temp)}=D^{(Y_1)}$;

starting from q=2, updating $W^{(temp)}$ as follows until q=Q: $W^{(temp)}(1: \text{length}(W^{(Y_q)}))=W^{(temp)}(1: \text{length}(W^{(Y_q)}))+a_q W^{(Y_q)}$;

starting from p=1, updating $W^{(temp)}$ and $D^{(temp)}$ as follows until p=P:

if $D^{(X_p)}$ belongs to $D^{(temp)}$, making $W^{(temp)}(i)=W^{(temp)}(i)+b_p$, i being the serial number of the element in $D^{(temp)}$ that is equal to $D^{(X_p)}$, and if $D^{(X_p)}$ does not belong to $D^{(temp)}$, making $W^{(temp)}=[W^{(temp)} \ b_p]$ and $D^{(temp)}=[D^{(temp)} \ D^{(X_p)}]$; and starting from q=Q, updating $W^{(X_q)}$ to $W^{(X_{q-1})}$, updating $D^{(Y_q)}$ to $D^{(Y_{q-1})}$ and when q=, updating $W^{(Y_1)}$ to $W^{(temp)}$ and updating $D^{(Y_1)}$ to $D^{(temp)}$.

$D^{(X_p)}$ represents the position information corresponding to $X_p$, wherein p=1, ... P, $D^{(Y_q)}$ represents the position information corresponding to $Y_q$, $W^{(Y_q)}$ represents the weight information corresponding to $Y_q$, wherein q=1, ... Q, $[b_1, \ldots b_P, a_1, \ldots a_Q]$ represents the coefficient vector corresponding the symbol on which the channel estimation is currently performed, and length(•) represents number of elements for calculating the vector.

Filter Coefficient Selecting Module 60 (Optional)

The RS distribution in a LTE system is discontinuous and uneven. If an identical coefficient is applied to all the symbols, it is unable to obtain an optimal interpolation effect. Therefore, different coefficients may be applied to the symbols in different scenarios so as to obtain an optimal interpolation effect. By means of the filter coefficient selecting module 60, the time-domain channel estimation filter according to the present invention is other than a conventional filter that merely has one set of coefficients.

The time-domain channel estimation filter with given frame structure, antenna port and CP mode will be applied to a series of specific filtering scenarios which are in one-to-one correspondence to time distance vectors. The time distance vector means the distance vector $T=[T_1, T_2, \ldots T_{P'}, T_{P'+1}, \ldots T_{P'+Q'}]$, $(0 \leq P' \leq P, 0 \leq Q' \leq Q)$ between a symbol corresponding to a valid element (a non-empty and non-zero element) in $X_1, X_2 \ldots X_P$ and $Y_1, Y_2, \ldots Y_Q$ and the symbol on which the channel estimation is currently performed. Each possible vector T is called as a scenario. The filter coefficient selecting module 60 selects the filter coefficient for a specific scenario in accordance with the practical requirement.

There are mainly two types of scenarios, i.e., initial scenarios and stable scenarios. The initial scenarios mean a series of scenarios during an initial phase of the filter where the valid elements in $X_1, X_2 \ldots X_P$ and $Y_1, Y_2, \ldots Y_Q$ changes from 0 to P or Q. When n is greater than a given value, the coefficient calculation will enter a stable state. At this time, some of the filtering scenarios will occur periodically, and the filter coefficient corresponding thereto will also occur periodically in the time domain. These scenarios are called as stable scenarios. The filter coefficient for the initial scenarios needs to be recorded in the filter coefficient selecting module 60 at the beginning, while the filter coefficient for the stable scenarios needs to be recorded in the filter coefficient selecting module 60 when the filter is in a stable state.

Figure 7:
FIG. 7 is a schematic view showing the time-domain filtering scenario segmentation for a LTE-TDD frame structure according to embodiments of the present invention.

Taking the filter with a TDD frame structure and a normal CP mode where the uplink and downlink subframes are configured as 1# and the special subframe is configured as 0#(where the DwPTS includes 3 symbols), all conditions may be covered by the six scenarios as shown in FIG. 7, i.e., scenario 1: an initial time slot; scenario 2: a previous time slot of a special time slot; scenario 3: DwPTS in the special subframe; scenario 4: a time slot immediately adjacent to the uplink subframe; scenario 5: a continuous time slot; and scenario 6: an end time slot. The unmarked portions in FIG. 7 indicate uplink time slots, UpPTS in the special subframe, or guard intervals in the special subframe.

For scenario 3, 3(P+Q) coefficients need to be stored, wherein 3 represents the number of symbols in DwPTS. For the other scenarios, 7(P+Q) coefficients need to be stored, wherein 7 represents the number of symbols in a downlink time slot.

Actually, there is also a transition phase for the filter between the initial scenario and the stable scenario. The time distance vectors corresponding to the symbols at this phase are all included in the time distance vectors corresponding to the stable scenario. However, for a given time distance vector, there is a difference between the coefficients corresponding thereto and the filter coefficients corresponding to the stable scenario. These coefficients may be stored or not be stored in accordance with the practical requirements.

Figure 8:
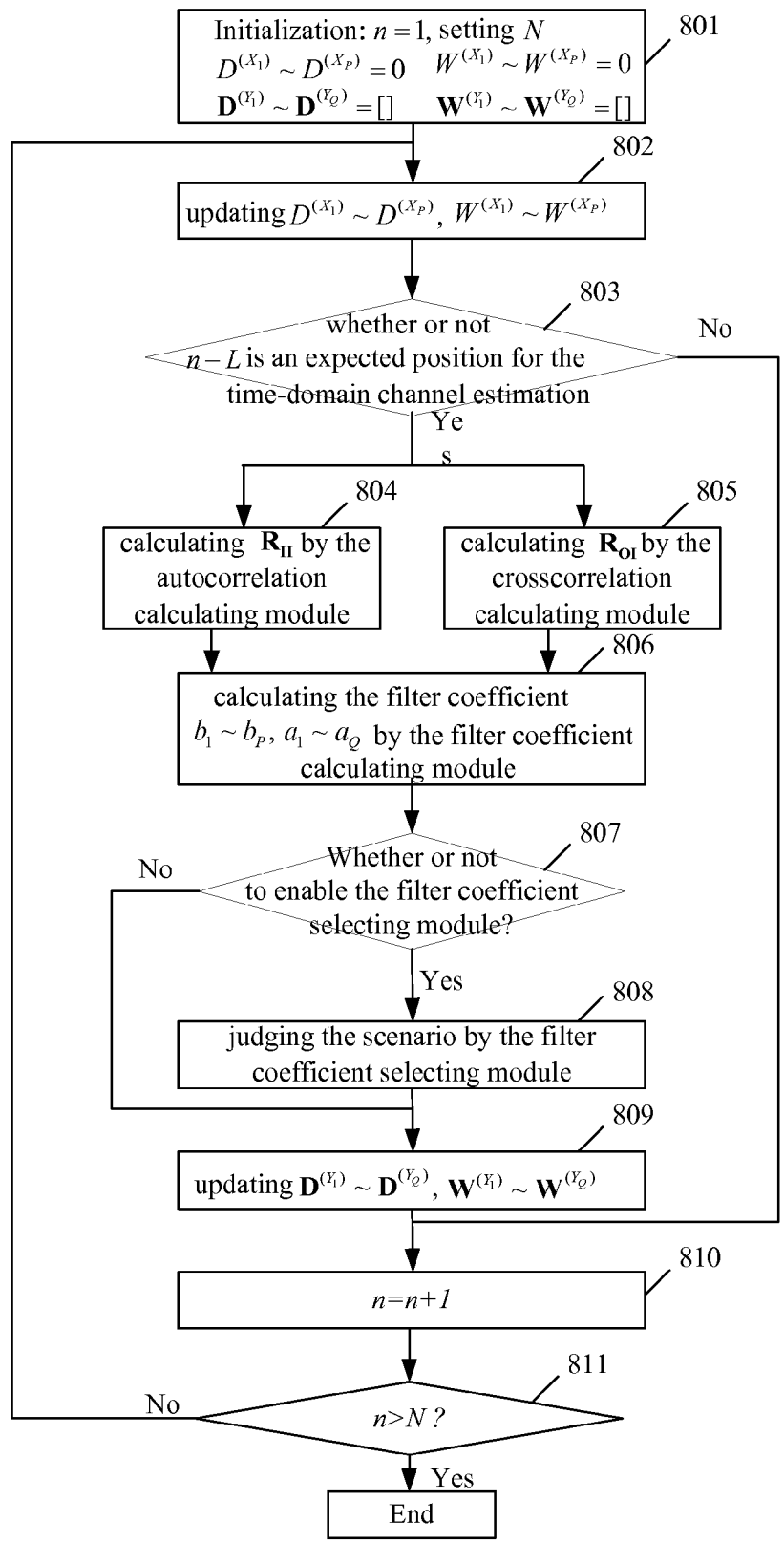
FIG. 8 is a flow chart of performing filter coefficient calculation using the device as shown in FIG. 6.

FIG. 8 is a detailed flow chart of performing filter coefficient calculation by using the device as shown in FIG. 6. The process comprises the following steps.

Step 801: performing initialization, i.e., making n=1, $D^{(X_1)} \sim D^{(X_P)}=0$, $W^{(X_1)} \sim W^{(X_P)}=0$, $D^{(Y_1)} \sim D^{(Y_Q)}=[\ ]$ and $W^{(Y_1)} \sim W^{(Y_Q)}=[\ ]$, and setting the number of iterations N.

Two conditions shall be met for the setting of N: it shall ensure to go through all of the filtering scenarios, which depends on the applied frame structure; and the coefficient calculation can enter a stable state, which depends on the set Doppler shift.

Step 802: when a new symbol (with a serial number of n) arrives, updating $D^{(X_1)} \sim D^{(X_P)}$ and $W^{(X_1)} \sim W^{(X_P)}$ by the first acquiring module 10.

Step 803: judging whether or not n−L is an expected position for the time-domain channel estimation, if yes, proceeding to Step 804, and otherwise proceeding to Step 810.

When the symbol n−L is not the expected position for the time-domain channel estimation, e.g., the current position is an uplink subframe in a TDD mode, the autocorrelation calculating module 30, the crosscorrelation calculating module 40, the filter coefficient calculating module 50 and the second acquiring module 20 will be skipped and no calculation will be performed.

Step 804: calculating an autocorrelation matrix $R_{II}$ of a vector I by the autocorrelation calculating module 30.

Step 805: calculating a crosscorrelation matrix $R_{OI}$ between a vector O and the vector I by the crosscorrelation calculating module 40.

The order of Steps 804 and 805 are not limited herein, i.e., Step 804 may be performed subsequent to Step 805, or the steps may be performed simultaneously.

Step 806: calculating the filter coefficient $b_1 \sim b_P$ and $a_1 \sim a_Q$ by the filter coefficient calculating module 50.

Step 807: judging whether or not to enable the filter coefficient selecting module 60, if yes, proceeding to Step 808, and otherwise proceeding to Step 810.

Step 808: judging the scenario to which the current symbol belongs by the filter coefficient selecting module 70, and creating a correspondence between filter coefficients and the scenario.

Step 809: updating $D^{(Y_1)} \sim D^{(Y_Q)}$ and $W^{(Y_1)} \sim W^{(Y_Q)}$ by the second acquiring module 20.

Step 810: making n=n+1

Step 811: judging whether or not n is greater than N, if yes, terminating the procedure, and otherwise, returning to Step 802.

In a word, the method and device according to the present invention may use iterative operation to record the position information and the weight information of $H_f^{(RS)}$ included in the current available resources $X_1, X_2 \ldots X_P$ and $Y_1, Y_2, \ldots Y_Q$, calculate the correlation between the available resources and the correlation between the available resources and the current symbol in accordance with the position information, weight information, channel information and system information, and thereby calculate an optimal filter coefficient. As a result, it is able to effectively overcome the problems due to the discontinuous and uneven RS distribution in the LTE system, and it is applicable to the coefficient design for the time-domain channel estimation filter with any frame structure and any antenna port in the LTE system.

The above embodiments are merely used for illustrating bur rather than limiting the present invention. It should be appreciated that, a person skilled in the art may further make improvements and equivalent substitutions without departing from the principle of the present invention, and these improvements and substitutions shall also be included in the scope of the present invention.

What is claimed is:

1. A method for calculating a coefficient of a time-domain channel estimation filter for use in a Long Term Evolution (LTE) system, comprising:
    acquiring position information and weight information of symbols carrying reference signal (RS) information corresponding to $X_1, X_2 \ldots X_P$, wherein $X_1, X_2 \ldots X_P$ are P frequency-domain channel estimation values of the symbols closest to a currently-input symbol, and P is an integer greater than 0;
    acquiring position information and weight information of symbols carrying RS information relating to $Y_1, Y_2, \ldots Y_Q$, wherein $Y_1, Y_2, \ldots Y_Q$ are Q time-domain channel estimation values of the symbols closest to a symbol on which the channel estimation is currently performed, and Q is an integer greater than 0;
    calculating an autocorrelation matrix of a vector I in accordance with the position information and the weight information, wherein $I=[X_1, X_2 \ldots X_P, Y_1, Y_2, \ldots Y_Q]$;
    calculating a crosscorrelation matrix of a vector O and the vector I in accordance with the position information and the weight information, wherein $O=[Y_0]$, and $Y_0$ is a time-domain channel ideal value of the symbol on which the channel estimation is currently performed; and
    calculating an inverse matrix product of the crosscorrelation matrix and the autocorrelation matrix, thereby obtaining a coefficient vector corresponding to the symbol on which the channel estimation is currently performed.

2. The method according to claim 1, wherein the acquiring position information and weight information of symbols carrying RS information corresponding to $X_1, X_2 \ldots X_P$ comprises:
    setting position information $D^{(X_i)}$ and weight information $W^{(X_i)}$ corresponding to $X_i$ to 0 during initialization, wherein $i=1, \ldots P$; and
    when a new symbol is input, judging whether or not the symbol carries the RS information, if yes, updating $D^{(X_i)}$ to $D^{(X_{i-1})}$ and updating $W^{(X_i)}$ to $W^{(X_{i-1})}$ from $i=P$, and when $i=1$, updating $D^{(X_1)}$ to n and updating $W^{(X_1)}$ to 1, n being a serial number of the symbol, otherwise, not updating the position information and the weight information.

3. The method according to claim 1, wherein the acquiring position information and weight information of symbols carrying RS information corresponding to $X_1, X_2 \ldots X_P$ comprises:

setting position information $D^{(X_i)}$ and weight information $W^{(X_i)}$ corresponding to $X_i$ to 0 during initialization, wherein $i=1, \ldots P$; and
    when a new symbol is input, updating $D^{(X_i)}$ to $D^{(X_{i-1})}$ and updating $W^{(X_i)}$ to $W^{(X_{i-1})}$ from $i=P$, judging whether or not the symbol carries the RS information when $i=1$, if yes, updating $D^{(X_1)}$ to n and updating $W^{(X_1)}$ to 1, n being a serial number of the symbol, otherwise, not updating $D^{(X_1)}$ and $W^{(X_1)}$.

4. The method according to claim 1, wherein an autocorrelation matrix $R_{II}$ of the vector I is calculated by the following equations:

$$R_{II} = E[II^H] = E\begin{bmatrix} X_1 X_1^* & X_1 X_2^* & \ldots & X_1 Y_Q^* \\ X_2 X_1^* & X_2 X_2^* & \ldots & X_2 Y_Q^* \\ \vdots & \vdots & \ddots & \vdots \\ X_Q X_1^* & X_Q X_2^* & \ldots & Y_Q Y_Q^* \end{bmatrix}$$

$$E[X_k X_m^*] = (E[X_k^* X_m])^* = W^{(X_k)}(W^{(X_m)})^* R(\tau_{D^{(X_k)}, D^{(X_m)}}),$$

$$k, m = 1, \ldots P$$

$$E[Y_k Y_m^*] = (E[Y_k^* Y_m])^* =$$

$$\sum_{i=1}^{length(D^{(Y_k)})} \sum_{j=1}^{length(D^{(Y_m)})} W^{(Y_k)}(i)(W^{(Y_m)}(j))^* R(\tau_{D^{(Y_k)}(i), D^{(Y_m)}(j)}),$$

$$k, m = 1, \ldots Q$$

$$E[Y_k X_m^*] = (E[Y_k^* X_m])^* = \sum_{i=1}^{length(D^{(Y_k)})} W^{(Y_k)}(i)(W^{(X_m)})^* R(\tau_{D^{(Y_k)}(i), D^{(X_m)}}),$$

$$k = 1, \ldots Q,$$

$$m = 1, \ldots P$$

wherein $E[\bullet]$ represents mathematical expectation operation, $D^{(X_m)}$ is the position information corresponding to $X_m$, $W^{(X_m)}$ is the weight information corresponding to $X_m$, $m=1, \ldots P$, $D^{(Y_k)}$ is the position information corresponding to $Y_k$, $W^{(Y_k)}$ is the weight information corresponding to $Y_k$, $k=1, \ldots Q$, $W^{(Y_k)}(j)$ is the $j^{th}$ element of $W^{(Y_k)}$, $D^{(Y_k)}(j)$ is the $j^{th}$ element of $D^{(Y_k)}$, length($\bullet$) is the number of elements when the vector is calculated, $R(\tau_{i,j})$ is a correlation function determined in accordance with channel information and system information, and $\tau_{i,j}$ is the time distance between the $i^{th}$ symbol and the $j^{th}$ symbol.

5. The method according to claim 1, wherein a crosscorrelation matrix $R_{OI}$ between the vector O and the vector I is calculated by the following equations:

$$R_{OI} = E[OI^H] = E\begin{bmatrix} Y_0 X_1^* \\ Y_0 X_2^* \\ \vdots \\ Y_0 Y_Q^* \end{bmatrix}$$

$$E[Y_0 Y_p^*] = (W^{(X_p)})^* R(\tau_{n-L, D^{(X_p)}}),$$

$$p = 1, \ldots P$$

$$E[Y_0 Y_q^*] = \sum_{i=1}^{length(D^{(Y_q)})} (W^{(Y_q)}(i))^* R(\tau_{n-L, D^{(Y_q)}(i)}),$$

$$q = 1, \ldots Q$$

wherein E[•] represents mathematical expectation operation, $D^{(X_p)}$ is the position information corresponding to $X_p$, $W^{(X_p)}$ is the weight information corresponding to $X_p$, p=1, ... P, $D^{(Y_q)}$ is the position information corresponding to $Y_q$, $W^{(Y_q)}$ is the weight information corresponding to $Y_q$, q=1, ... Q, $W^{(Y_q)}(i)$ is the $i^{th}$ element of $W^{(Y_q)}$, $D^{(Y_q)}(i)$ is the $i^{th}$ element of $D^{(Y_q)}$, length(•) is the number of elements when the vector is calculated, $R(\tau_{i,j})$ is a correlation function determined in accordance with channel information and system information, $\tau_{i,j}$ the time distance between the $i^{th}$ symbol and the $j^{th}$ symbol, n−L is the serial number of the symbol on which the channel estimation is currently performed, n is the serial number of the currently-input symbol, and L is a time delay, i.e., the number of symbols between input and output of the filter.

6. The method according to claim 4, wherein the correlation function is:

$$R(\tau_{i,j}) = J_0(2\pi f_{max}\tau_{i,j})$$

wherein $J_0(\bullet)$ represents a first-class 0-order Bessel function, $f_{max}$ represents a maximum Doppler shift, $\tau_{i,j}=T_{sym}|i-j|$, and $T_{sym}$ represents a time length of a symbol.

7. The method according to claim 1, wherein when the autocorrelation matrix is not of full rank, the method further comprises:
updating the autocorrelation matrix to a full-rank matrix by means of dimension reduction, and updating the crosscorrelation matrix correspondingly,
and wherein the calculating an inverse matrix product of the crosscorrelation matrix and the autocorrelation matrix comprises calculating an inverse matrix product of the updated crosscorrelation matrix and the updated autocorrelation matrix.

8. The method according to claim 7, further comprising:
normalizing the coefficient vector.

9. The method according to claim 1, wherein the acquiring the position information and the weight information of the symbols carrying the RS information relating to $Y_1, Y_2, ... Y_Q$ comprises:
acquiring the position information and weight information of the symbols carrying the RS information relating to $Y_oY_2, ... Y_Q$ corresponding to the symbol on which the channel estimation is currently performed, wherein the position information and the weight information are obtained after the coefficient calculation on a previous symbol, and during initialization, the position information and the weight information are blank, and
after obtaining the coefficient vector corresponding to the symbol on which the channel estimation is currently performed, the method further comprises updating the position information and the weight information of the symbols carrying the RS information relating to $Y_1, Y_2, ... Y_Q$ for the coefficient calculation on a next symbol.

10. The method according to claim 9, wherein the updating the position information and the weight information of the symbols carrying the RS information relating to $Y_1, Y_2, ... Y_Q$ comprises:
making $W^{(temp)}=a_1 W^{(Y_1)}$ and $D^{(temp)}=D^{(Y_1)}$;
starting from q=2, updating $W^{(temp)}$ as follows until q=Q:
$W^{(temp)}(1: length(W^{(Y_q)}))=W^{(temp)}(1: length(W^{(Y_q)}))+a_q W^{(Y_q)}$
starting from p=1, updating $W^{(temp)}$ and $D^{(temp)}$ as follows until p=P:

if $D^{(X_p)}$ belongs to $D^{(temp)}$, making $W^{(temp)}(i)=W^{(temp)}(i)+b_p$, i being the serial number of the element in $D^{(temp)}$ that is equal to $D^{(X_p)}$, and
if $D^{(X_p)}$ does not belong to $D^{(temp)}$, making $W^{(temp)}=[W^{(temp)} b_p]$ and $D^{(temp)}=[D^{(temp)} D^{(X_p)}]$; and
starting from q=Q, updating $W^{(Y_q)}$ to $W^{(Y_{q-1})}$, updating $D^{(Y_q)}$ to $D^{(Y_{q-1})}$, and when q=1, updating $W^{(Y_1)}$ to $W^{(temp)}$ and updating $D^{(Y_1)}$ to $D^{(temp)}$,
wherein $D^{(X_p)}$ represents the position information corresponding to $X_p$, p=1, ... P, $D^{(Y_q)}$ represents the position information corresponding to $Y_q$, $W^{(Y_q)}$ represents the weight information corresponding to $Y_q$, q=1, ... Q, $[b_1, ... b_P, a_1, ... a_Q]$ represents the coefficient vector corresponding the symbol on which the channel estimation is currently performed, and length(•) represents number of elements for calculating the vector.

11. The method according to claim 1, further comprising:
calculating a distance vector between a symbol corresponding to a valid element in I and the symbol on which the channel estimation is currently performed;
determining a scenario to which the symbol on which the channel estimation is currently performed belongs in accordance with the distance vector; and
after the coefficient calculation enters a stable state, recording the calculated coefficient vector as a filter coefficient for the corresponding scenario.

12. A device for calculating a coefficient of a time-domain channel estimation filter for use in a Long Term Evolution (LTE) system, comprising:
a first acquiring module, configured to acquire position information and weight information of symbols carrying reference signal (RS) information corresponding to $X_1, X_2 ... X_P$, wherein $X_1, X_2 ... X_P$ are P frequency-domain channel estimation values of the symbols closest to a currently-input symbol, and P is an integer greater than 0;
a second acquiring module, configured to acquire position information and weight information of symbols carrying RS information relating to $Y_1, Y_2, ... Y_Q$, wherein $Y_1, Y_2, ... Y_Q$ are Q time-domain channel estimation values of the symbols closest to a symbol on which the channel estimation is currently performed, and Q is an integer greater than 0;
an autocorrelation calculating module, configured to calculate an autocorrelation matrix of a vector I in accordance with the position information and the weight information, wherein I=$[X_1, X_2 ... X_P, Y_1, Y_2, ... Y_Q]$;
a crosscorrelation calculating module, configured to calculate a crosscorrelation matrix of a vector O and the vector I in accordance with the position information and the weight information, wherein O=$[Y_0]$, and $Y_0$ is a time-domain channel ideal value of the symbol on which the channel estimation is currently performed; and
a filter coefficient calculating module, configured to calculate an inverse matrix product of the crosscorrelation matrix and the autocorrelation matrix, thereby to obtain a coefficient vector corresponding to the symbol on which the channel estimation is currently performed.

13. The device according to claim 12, wherein the first acquiring module is further configured to:
set position information $D^{(X_i)}$ and weight information $W^{(X_i)}$ corresponding to $X_i$ to 0 during initialization, wherein i=1, ... P; and
when a new symbol is input, judge whether or not the symbol carries the RS information, if yes, update $D^{(X_i)}$ to $D^{(X_{i-1})}$ and update $W^{(X_i)}$ to $W^{(X_{i-1})}$ from i=P, and when i=1, update $D^{(X_1)}$ to n and update $W^{(X_1)}$ to 1, n being a serial number of the symbol, otherwise, not update the position information and the weight information.

14. The device according to claim 12, wherein the first acquiring module is further configured to:
set position information $D^{(X_i)}$ and weight information $W^{(X_i)}$ corresponding to $X_i$ to 0 during initialization, wherein i=1, ... P; and
when a new symbol is input, update $D^{(X_i)}$ to $D^{(X_{i-1})}$ and update $W^{(X_i)}$ to $W^{(X_{i-1})}$ from i=P, judge whether or not the symbol carries the RS information when i=1, if yes, update $D^{(X_1)}$ to n and update $W^{(X_1)}$ to 1, n being a serial number of the symbol, otherwise, not update $D^{(X_1)}$ and $W^{(X_1)}$.

15. The device according to claim 12, wherein the autocorrelation calculating module is further configured to calculate an autocorrelation matrix $R_{II}$ of the vector I by the following equations:

$$R_{II} = E[II^H] = E\begin{bmatrix} X_1X_1^* & X_1X_2^* & \ldots & X_1Y_Q^* \\ X_2X_1^* & X_2X_2^* & \ldots & X_2Y_Q^* \\ \vdots & \vdots & \ddots & \vdots \\ Y_QX_1^* & Y_QX_2^* & \ldots & Y_QY_Q^* \end{bmatrix}$$

$$E[X_kX_m^*] = (E[X_k^*X_m])^* = W^{(X_k)}(W^{(X_m)})^*R(\tau_{D^{(X_k)},D^{(X_m)}}),$$

$$k, m = 1, \ldots P$$

$$E[Y_kY_m^*] = (E[Y_k^*Y_m])^* =$$

$$\sum_{i=1}^{length(D^{(Y_k)})} \sum_{j=1}^{length(D^{(Y_m)})} W^{(Y_k)}(i)(W^{(Y_m)}(j))^*R(\tau_{D^{(Y_k)}(i),D^{(Y_m)}(j)}),$$

$$k, m = 1, \ldots Q$$

$$E[Y_kX_m^*] = (E[Y_k^*X_m])^* = \sum_{i=1}^{length(D^{(Y_k)})} W^{(Y_k)}(i)(W^{(X_m)})^*R(\tau_{D^{(Y_k)}(i),D^{(X_m)}}),$$

$$k = 1, \ldots Q,$$

$$m = 1, \ldots P$$

wherein $E[\cdot]$ represents mathematical expectation operation, $D^{(X_m)}$ is the position information corresponding to $X_m$, $W^{(X_m)}$ is the weight information corresponding to $X_m$, m=1, ... P, $D^{(Y_k)}$ is the position information corresponding to $Y_k$, $W^{(Y_k)}$ is the weight information corresponding to $Y_k$, k=1, ... Q, $W^{(Y_k)}(j)$ is the $j^{th}$ element of $W^{(Y_k)}$, $D^{(Y_k)}(j)$ is the $j^{th}$ element of $D^{(Y_k)}$, length($\cdot$) is the number of elements when the vector is calculated, $R(\tau_{i,j})$ is a correlation function determined in accordance with channel information and system information, and $\tau_{i,j}$ is the time distance between the $i^{th}$ symbol and the $j^{th}$ symbol.

16. The device according to claim 12, wherein the crosscorrelation calculating module is further configured to calculate a crosscorrelation matrix $R_{OI}$ between the vector O and the vector I by the following equations:

$$R_{OI} = E[OI^H] = E\begin{bmatrix} Y_0X_1^* \\ Y_0X_2^* \\ \vdots \\ Y_0Y_Q^* \end{bmatrix}$$

$$E[Y_0X_p^*] = (W^{(X_p)})^*R(\tau_{n-L,D^{(X_p)}}),$$

$$p = 1, \ldots P$$

$$E[Y_0Y_q^*] = \sum_{i=1}^{length(D^{(Y_q)})} (W^{(Y_q)}(i))^*R(\tau_{n-L,D^{(Y_q)}(i)}),$$

$$q = 1, \ldots Q$$

and wherein $E[\cdot]$ represents mathematical expectation operation, $D^{(X_p)}$ is the position information corresponding to $X_q$, $W^{(X_p)}$ is the weight information corresponding to $X_P$, p=1, ... P, $D^{(Y_q)}$ is the position information corresponding to $Y_q$, $W^{(Y_q)}$ is the weight information corresponding to $Y_q$, q=1, ... Q, $W^{(Y_q)}(i)$ is the $i^{th}$ element of $W^{(Y_q)}$, $D^{(Y_q)}(i)$ is the $i^{th}$ element of $D^{(Y_q)}$, length($\cdot$) is the number of elements when the vector is calculated, $R(\tau_{i,j})$ is a correlation function determined in accordance with channel information and system information, $\tau_{i,j}$ is the time distance between the $i^{th}$ symbol and the $j^{th}$ symbol, n–L is the serial number of the symbol on which the channel estimation is currently performed, n is the serial number of the currently-input symbol, and L is a time delay, i.e., the number of symbols between input and output of the filter.

17. The device according to claim 15, wherein the correlation function is:

$$R(\tau_{i,j}) = J_0(2\pi f_{max}\tau_{i,j})$$

wherein $J_0(\cdot)$ represents a first-class 0-order Bessel function, $f_{max}$ represents a maximum Doppler shift, $\tau_{i,j} = T_{sym}|i-j|$, and $T_{sym}$ represents a time length of a symbol.

18. The device according to claim 12, wherein the second acquiring module is further configured to:
acquire the position information and weight information of the symbols carrying the RS information relating to $Y_1$, $Y_2$, ... $Y_Q$ corresponding to the symbol on which the channel estimation is currently performed, wherein the position information and the weight information are obtained after the coefficient calculation on a previous symbol, and during initialization, the position information and the weight information are blank; and
after obtaining the coefficient vector corresponding to the symbol on which the channel estimation is currently performed, update the position information and the weight information of the symbols carrying the RS information relating to $Y_1, Y_2, \ldots Y_Q$ for the coefficient calculation on a next symbol.

19. The device according to claim 18, wherein the second acquiring module is further configured to update the position information and the weight information of the symbols carrying the RS information relating to $Y_1, Y_2, \ldots Y_Q$ by:
making $W^{(temp)} = a_1 W^{(Y_1)}$ and $D^{(temp)} = D^{(Y_1)}$;
starting from q=2, updating $W^{(temp)}$ as follows until q=Q: $W^{(temp)}(1: length(W^{(Y_q)})) = W^{(temp)}(1: length(W^{(Y_q)})) + a_q W^{(Y_q)}$
starting from p=1, updating $W^{(temp)}$ and $D^{(temp)}$ as follows until p=P:
  if $D^{(X_p)}$ belongs to $D^{(temp)}$, making $W^{(temp)}(i) = W^{(temp)}(i) + b_p$, i being the serial number of the element in $D^{(temp)}$ that is equal to $D^{(X_p)}$, and
  if $D^{(X_p)}$ does not belong to $D^{(temp)}$, making $W^{(temp)} = [W^{(temp)} b_p]$ and $D^{(temp)} = [D^{(temp)} D^{(X_p)}]$; and
starting from q=Q, updating $W^{(Y_q)}$ to $W^{(Y_{q-1})}$, updating $D^{(Y_q)}$ to $D^{(Y_{q-1})}$, and when q=1, updating $W^{(Y_1)}$ to $W^{(temp)}$ and updating $D^{(Y_1)}$ to $D^{(temp)}$,
and wherein $D^{(Y_p)}$ represents the position information corresponding to $X_P$, p=1, ... P, $D^{(Y_q)}$ represents the position information corresponding to $Y_q$, $W^{(Y_q)}$ represents the weight information corresponding to $Y_q$, q=1, ... Q, $[b_1, \ldots b_P, a_1, \ldots a_Q]$ represents the coefficient vector corresponding the symbol on which the channel estimation is currently performed, and length(•) represents number of elements for calculating the vector.

20. The device according to claim 12, further comprises a filter coefficient selecting module configured to:
   calculate a distance vector between a symbol corresponding to a valid element in I and the symbol on which the channel estimation is currently performed;
   determine a scenario to which the symbol on which the channel estimation is currently performed belongs in accordance with the distance vector; and
   after the coefficient calculation enters a stable state, record the calculated coefficient vector as a filter coefficient for the corresponding scenario.

* * * * *